(12) United States Patent
Tanneau (10) Patent No.: US 7,561,600 B2
(45) Date of Patent: Jul. 14, 2009

(54) SYNCHRONIZATION AT MULTIFRAME LEVEL OF A MOBILE TERMINAL OF A RADIOCOMMUNICATIONS SYSTEM

(75) Inventor: Lannig Tanneau, Montigny le Bretonneux (FR)

(73) Assignee: Eads Telecom, Montigny le Bretonneux (FR)

( * ) Notice: Subject to any disclaimer, the term of this patent is extended or adjusted under 35 U.S.C. 154(b) by 326 days.

(21) Appl. No.: 10/559,424

(22) PCT Filed: Jun. 1, 2004

(86) PCT No.: PCT/EP2004/006578

§ 371 (c)(1),
(2), (4) Date: Dec. 7, 2005

(87) PCT Pub. No.: WO2004/109954

PCT Pub. Date: Dec. 16, 2004

(65) Prior Publication Data

US 2006/0140220 A1 Jun. 29, 2006

(30) Foreign Application Priority Data

Jun. 6, 2003 (FR) ................................. 03 06901

(51) Int. Cl.
*H04J 3/06* (2006.01)
(52) U.S. Cl. ...................... 370/509; 370/514
(58) Field of Classification Search ............. 370/350, 370/321, 442, 503, 507, 509, 510, 511, 512, 370/513, 514, 324, 473, 320, 515
See application file for complete search history.

(56) References Cited

U.S. PATENT DOCUMENTS

| 5,742,647 | A | 4/1998 | Chaisemartin | |
|---|---|---|---|---|
| 6,483,815 | B1* | 11/2002 | Laurent et al. | 370/318 |
| 7,305,012 | B1* | 12/2007 | De Angeli et al. | 370/509 |
| 2004/0095953 | A1* | 5/2004 | Bellier et al. | 370/442 |
| 2004/0100994 | A1* | 5/2004 | Miller | 370/503 |

FOREIGN PATENT DOCUMENTS

| EP | 1 014 601 | 6/2000 |
|---|---|---|
| EP | 1 094 615 | 4/2001 |
| FR | 2 812 787 | 8/2002 |
| WO | WO 02 45290 | 6/2002 |

OTHER PUBLICATIONS

International Search Report dated Oct. 19, 2004 for International Application PCT/EP2004/006578.

* cited by examiner

*Primary Examiner*—Brenda Pham
(74) *Attorney, Agent, or Firm*—McCracken & Frank LLP (57) ABSTRACT

To allow the synchronization at multiframe level of a mobile terminal on a traffic down path which exhibits a multiframe structure with a determined number L of useful data frames, the base stations send signalling frames respectively associated with each useful data frame of the traffic down path and each containing a signalling code. The number N of distinct values of the signalling codes which are usable by the mobile terminal to recover the synchronization at multiframe level is less than L. These values are apportioned to the associated signalling frames in such a way that there exist two integers P and Q, not both equal to unity, such that P×Q of these values, respectively contained in P sequences of associated signalling frames each comprising Q signalling frames respectively associated with any Q consecutive useful data frames of a multiframe, form a unique word.

13 Claims, 4 Drawing Sheets

| 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|
| a5 | a1 | S | a7 | a4 | a1 | S | a3 | a1 | S | a5 | a2 | a1 | S | a1 | a1 | S | S |

$f_{TD}$

| 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|
| a8 | a1 | S | a8 | a4 | a3 | S | a7 | a5 | S | a7 | S | a7 | a7 | a6 | a4 | a4 | a6 |

| 37 | 38 | 39 | 40 | 41 | 42 | 43 | 44 | 45 | 46 | 47 | 48 | 49 | 50 | 51 | 52 | 53 | 54 |
|---|---|---|---|---|---|---|---|---|---|---|---|---|---|---|---|---|---|
| a6 | a2 | S | a8 | a3 | a2 | S | a4 | a2 | S | a6 | a1 | a2 | S | a2 | a2 | S | S |

| 55 | 56 | 57 | 58 | 59 | 60 | 61 | 62 | 63 | 64 | 65 | 66 | 67 | 68 | 69 | 70 | 71 | 72 |
|---|---|---|---|---|---|---|---|---|---|---|---|---|---|---|---|---|---|
| a7 | a2 | S | a7 | a3 | a4 | S | a8 | a6 | S | a8 | S | a8 | a8 | a5 | a3 | S | a5 |

FIG. 4

SYNCHRONIZATION AT MULTIFRAME LEVEL OF A MOBILE TERMINAL OF A RADIOCOMMUNICATIONS SYSTEM

BACKGROUND OF THE INVENTION

1. Technical Field

The present invention relates to the synchronization at multiframe level, on a determined traffic down channel, of a mobile terminal of a radiocommunications system.

2. Related Art

It finds applications, in particular, in cellular radiocommunications systems, for example professional radiocommunications systems or PMR (Professional Mobile Radiocommunication).

In such a system, a mobile terminal sometimes needs to change cell in the course of communication. In each cell of the cellular network, the base stations and the mobile terminals exchange traffic information (voice or data) over traffic paths exhibiting one and the same unique multiframe structure, a multiframe being a group of frames which repeats periodically.

A traffic down path serves for the transfer of information from the network to the mobile terminals. Conversely, a traffic uplink serves for the transfer of information from the mobile terminals to the network. In general, a traffic uplink is associated with a traffic down path, to allow duplex communications.

Within one and the same cell, all the information sent is synchronized at the multiframe level. However, in certain systems, the cells of the network are not synchronized with respect to one another.

This is why, so that the terminal changes cell while losing the least possible traffic (in send mode for a sending terminal or in receive mode for a receiving terminal), it must, preferably prior to this change, have recovered the synchronization at multiframe level of the destination traffic path (that is to say the traffic path over which the communication in progress is set up in the destination cell, and over to which it is getting ready to switch). For this purpose, it must acquire:

synchronization at frequency level;
synchronization at bit level (recovery of the bit time);
synchronization at frame level (recovery of the start of each frame); and
synchronization at multiframe level (index number of the frames in the multiframe).

When a mobile terminal has recovered synchronization at multiframe level, it knows the structure of the logical channels of the traffic path and the corresponding frame formats: it knows where the traffic frames (voice or data) are and where the signalling frames are, their role, for whom they are intended, etc. The mobile terminal can then again participate in the communication in the destination cell.

The carrier frequency of the destination traffic path is communicated to the mobile terminal by the network. Synchronization at bit level and synchronization at frame level are conventionally recovered by monitoring a beacon path (MCCH channel, standing for "Main Control Channel") sent continuously in the destination cell.

However, techniques based on the monitoring of the beacon path are not in general suitable for the recovery of synchronization at multiframe level, on account of the narrowness and of the small number of the monitoring windows at the disposal of the mobile terminal.

This is why mechanisms have already been proposed for searching for synchronization at multiframe level based on a signalling down channel in which information respectively associated with each frame of the traffic down path is despatched, and which allow the mobile terminals to recover the synchronization at multiframe level. Once the terminal is able, by means of this information, to identify any frame in the multiframe unequivocally, the synchronization at multiframe level is recovered.

A mechanism of this type is described, for example, in European Patent Application EP-A-1 094 615, within the context of a CDMA system. Each time slot is divided into two subfields one of which contains a synchronization code and the other of which contains useful signalling or traffic information (voice or data). The synchronization code is different in each time slot of the multiframe and is indicative of the start of the multiframe. Nevertheless, the synchronization codes must be coded on a number of bits which may become significant if the number of frames in the multiframe is high. This penalizes the bandwidth of the system, that is to say the throughput of useful information.

BRIEF DESCRIPTION OF THE INVENTION

The invention aims to allow the synchronization at multiframe level of a mobile terminal on a determined traffic down path, which does not have the aforesaid drawbacks of the prior art.

For this purpose, a first aspect of the invention relates to a method for allowing the synchronization at multiframe level of a mobile terminal of a radiocommunications system on a traffic down path which exhibits a multiframe structure with a determined number L of useful data frames. The method is of the type comprising the sending by a base station of the system, of signalling frames respectively associated with each useful data frame of the traffic down path and each containing a signalling code. According to the invention, the number N of distinct values of the signalling codes which are usable by the mobile terminal to recover the synchronization at multiframe level, hereinafter called synchronization values, is less than L. In addition, the said N synchronization values are apportioned to the associated signalling frames in such a way that there exist two integer numbers P and Q, not both equal to unity, such that the P×Q synchronization values respectively contained in P sequences of associated signalling frames each comprising Q signalling frames respectively associated with any Q consecutive useful data frames of a multiframe, form a unique word.

Thus, rather than giving directly, in the signalling codes despatched in the associated signalling frames, the index number of the frame in the multiframe (which may be expensive in terms of bandwidth), N synchronization values are apportioned to the associated signalling frames, with N<L, in such a way that a mobile terminal which has the ability to recover P signalling code sequences, each formed of a determined number Q of consecutive signalling codes, is guaranteed to recover the synchronization at multiframe level.

This method applies, in particular, in the base stations of the radiocommunications system.

A second aspect of the invention relates to a method of synchronization at multiframe level of a mobile terminal of a radiocommunications system on a traffic down path which exhibits a multiframe structure with a determined number L of useful data frames. The method is of the type comprising the use by the mobile terminal, in order to recover the synchronization at the multiframe level, of signalling codes respectively contained in signalling frames which are sent by a base station of the system while being respectively associated with each useful data frame of the traffic down path. The number N of distinct values of the signalling codes which are usable by the mobile terminal to recover the synchronization at multiframe level, hereinafter called synchronization values, is less than L. The said N synchronization values are apportioned to the associated signalling frames in such a way that there exist two integer numbers P and Q, not both equal to unity, such that the P×Q synchronization values respectively contained in P sequences of associated signalling frames each comprising Q signalling frames respectively associated with any Q consecutive useful data frames of a multiframe, form a unique word, the method incorporates the following steps and characteristics. On the one hand the mobile terminal performs monitorings inside at least P determined monitoring windows, so as to detect signalling frames respectively associated with useful data frames of the traffic down path. Moreover, the size of the monitoring windows is adapted so that, in each of them, the mobile terminal receives at least Q signalling frames respectively associated with any Q consecutive useful data frames of the traffic down path. Finally, the mobile terminal recovers the synchronization at multiframe level on the basis of a word formed of the P×Q synchronization values respectively contained in the P×Q associated signalling frames thus received.

This method applies, in particular, in the mobile terminals of the radiocommunications system.

A third aspect of the invention relates to a signal intended to be sent by a base station of a radiocommunications system on a determined carrier frequency on which is set up a traffic down path which exhibits a multiframe structure with a determined number L of useful data frames. The signal comprises signalling frames respectively associated with each useful data frame and each containing a signalling code. According to the invention, the number N of distinct values of the signalling codes which are usable by the mobile terminal to recover the synchronization at multiframe level, hereinafter called synchronization values, is less than L. In addition, the said N synchronization values are apportioned to the associated signalling frames in such a way that there exist two integer numbers P and Q, not both equal to unity, such that the P×Q synchronization values respectively contained in P sequences of associated signalling frames each comprising Q signalling frames respectively associated with any Q consecutive useful data frames of a multiframe, form a unique word.

DESCRIPTION OF PREFERRED EMBODIMENTS

The invention is described hereinbelow in an exemplary application to a system for radiocommunications with mobiles. It is for example a private system for professional radiocommunications, such as the "Project 25 phase II 2-slot TDMA" system. This is essentially an FDMA system, but one which also provides for TDMA type multiple access of order 2 (TDMA-2 system) by time-division multiplexing of two communications on one and the same traffic path.

On appropriate traffic paths, each base station can set up traffic channels (or TCH channels, standing for "Traffic Channel") with one or more mobile terminals situated in its radio coverage zone, after a call set-up procedure performed by means of a dedicated control channel. On appropriate signalling paths it can also set up signalling channels such as the beacon channel (MCCH channel), which do not come within the subject of the present description.

Figure 4:
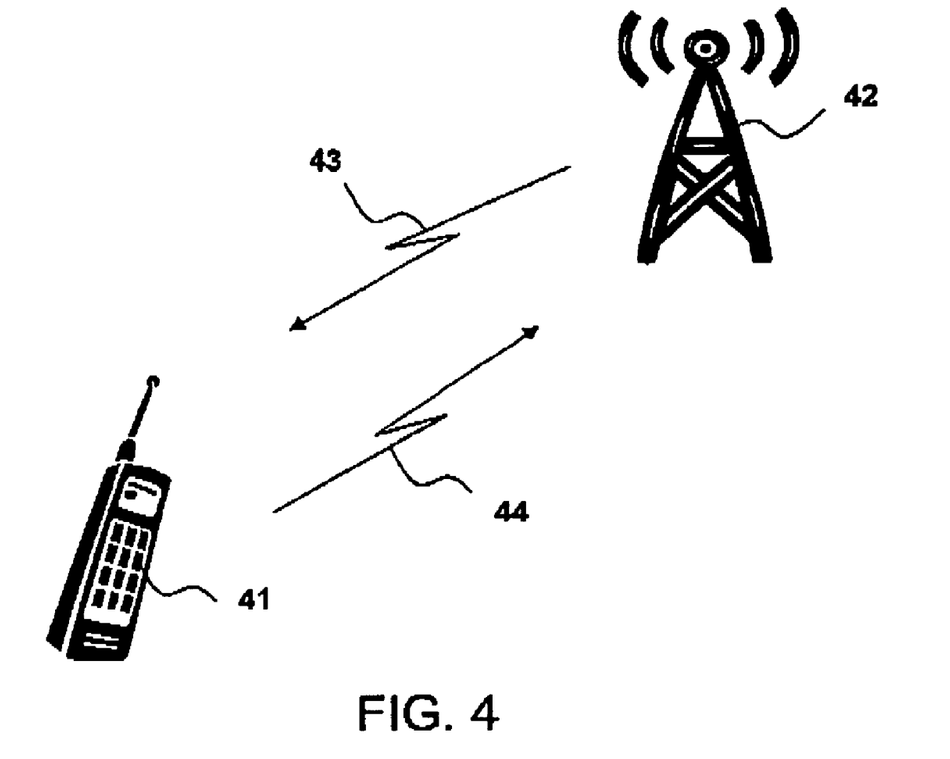

A duplex communication with a mobile terminal 41 and a base station 42 requires a TCH channel set up on a down path 43 and a TCH channel set up on an uplink 44, each of which is set up on a determined carrier frequency.

In general, a TCH channel is multiplexed, on the determined carrier frequency defining the traffic uplink or the traffic down path, with associated signalling channels (or SACCH channels, standing for "Slow Associated Control Channel") serving to exchange signalling with the mobile terminal in the course of communication. It may involve signalling exchanged end-to-end (that is to say from a mobile terminal to another mobile terminal) or signalling exchanged with the network.

Within the sense of the present account, the terms "useful data frames" refer equally well to TCH frames and SACCH frames, as opposed to the associated signalling frames (or ASCH frames) to which we shall return later.

Figure 1:
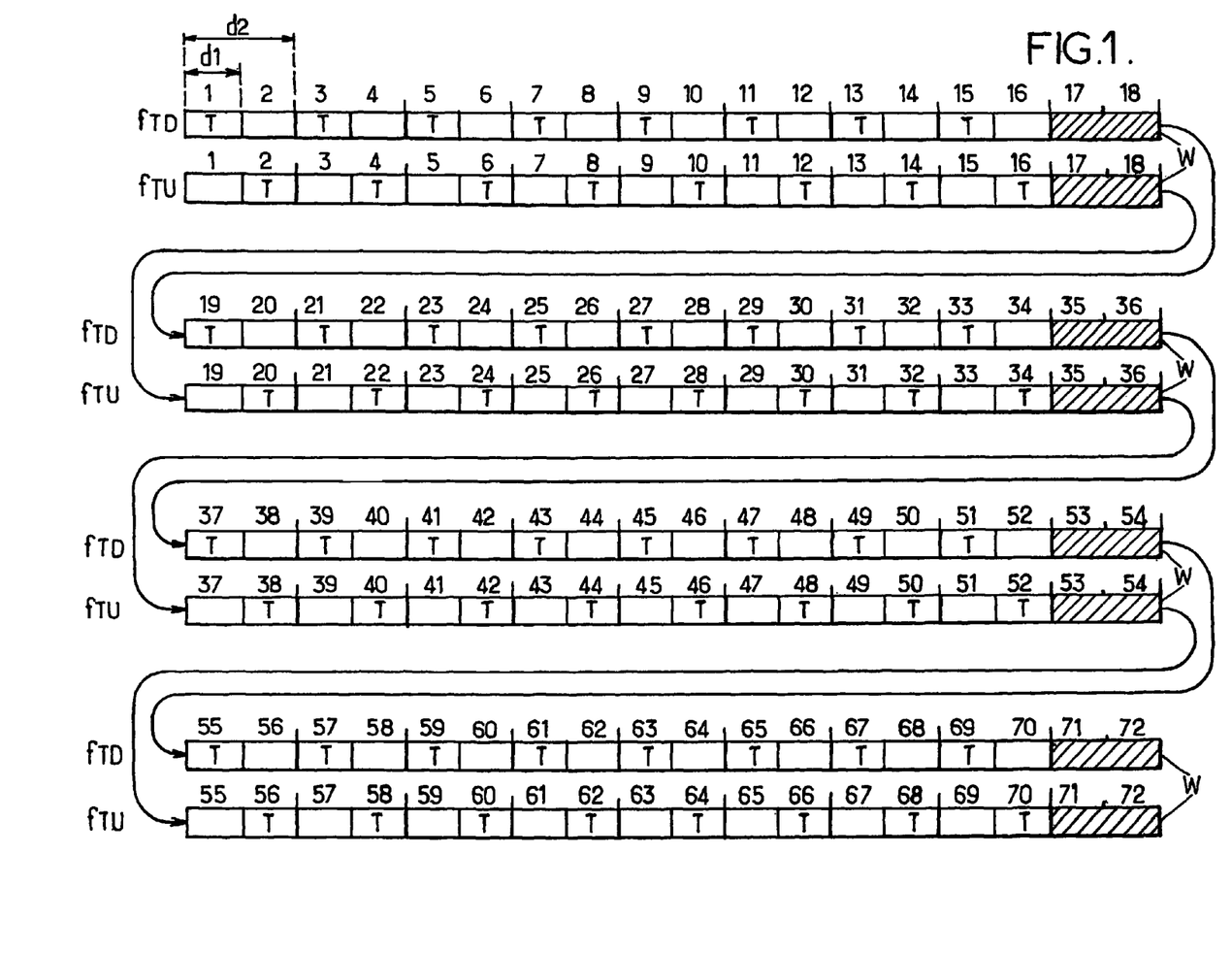
FIG. 1 is a diagram illustrating an exemplary multiframe structure for the transmission of information over traffic paths of a radiocommunications system.

The timing diagram of FIG. 1 illustrates an exemplary multiframe structure, for the exchange of information over an associated traffic uplink and down path. Represented in this figure juxtaposed along the vertical are on the one hand the multiframe structure on the traffic uplink set up on a determined frequency $f_{TU}$, and on the other hand, the multiframe structure on a traffic down path set up on a determined frequency $f_{TD}$. Each multiframe is subdivided into four segments, which are represented one above the other in the figure. Stated otherwise, a segment corresponds to a quarter of a multiframe. Each segment is composed of nine composite time slots each having a duration d2 equal to 40 ms. Each composite time slot comprises two consecutive elementary time slots, each having a duration d1 equal to 20 ms. In the figure, the index numbers indicated above the multiframe correspond to the index numbers of elementary time slots. The information of a determined channel (TCH traffic channel or SACCH signalling channel) which is transmitted in an elementary time slot such as this, is called a "useful data frame". In total, the multiframe therefore comprises a number L of useful data frames which is equal to 72 in the example.

Each of the first eight composite time slots of each segment of the multiframe comprises an elementary time slot of odd index number for the down direction and an elementary time slot of even index number for the up direction, which are labelled by the letter T. The recurrent series of these time slots T forms a TCH channel, respectively down and up, associated with a determined communication. As will have been understood, on the same traffic down path defined by the frequency $f_{TD}$, the base station can multiplex, in the even elementary time slots, another TCH channel assigned to another communication. Moreover, the mobile terminal is in the receive phase on the down path for half the time (corresponding to the odd elementary time slots), and is in the send phase on the uplink for the other half of the time (corresponding to the even elementary time slots). One speaks of "half-duplex" mode to designate this configuration.

In certain systems, there also exists a "full-duplex" mode in which the mobile terminal is simultaneously in the received phase on the traffic down path for the two composite time slots of each of the first eight composite time slots of each segment, and in the send phase on the traffic uplink for the two composite time slots of each of the first eight composite time slots of each segment. On command, the system can go from the "half-duplex" mode to the "full-duplex" mode, and vice versa, as required.

The ninth composite time slot of each segment is normally reserved for the transmission of signalling information. These time slots form SACCH channels, respectively down for the traffic down path and up for the traffic uplink. Nevertheless, in the multiframe synchronization search phase, these time slots may advantageously be used by the mobile terminals as respective monitoring windows W. A monitoring window is thus at the disposal of the mobile terminal at best every 360 ms. Of course, this is achieved at the price of the loss of the frames of the SACCH channels.

Let us now turn more particularly to the mechanism for searching for synchronization at multiframe level according to the invention. The principle of such a mechanism is to associate with each frame of the traffic down path, an associated signalling frame in which information that allows the terminals to recover the multiframe synchronization is despatched. These associated signalling frames form a channel which, in what follows, is called the ASCH channel (standing for "Associated Signalling Channel").

Rather than sending directly in each ASCH frame the index number of the associated frame in the multiframe (which requires the sending of a code having at least 72 distinct values, hence coded on at least 7 bits, and which may therefore be expensive in terms of bandwidth), the following provisions are envisaged.

On the one hand, in the ASCH frames, the base station sends signalling codes exhibiting a number of distinct values usable by the mobile terminals for the recovery of synchronization (hereinafter synchronization values) which is less than L, which is a fortiori the case when the signalling codes are coded on a number of bits that is less than the number $int[\log_2(L)]+1$, where int designates the integer part operator, and where $\log_2$ designates the logarithm function to the base 2.

Moreover, the various synchronization values, that is to say the distinct values of the signalling codes transmitted in the respective ASCH frames which are usable for the recovery of synchronization, are apportioned to the AACH frames in such a way that a terminal which has the possibility of recovering a number P of synchronization value sequences each comprising a number Q of synchronization values respectively received in AACH frames associated with consecutive TCH or SACCH frames of a multiframe, is guaranteed to recover the synchronization at multiframe level.

Let us take for example an AACH channel formed of the succession of AACH frames each of 4 bits, this giving signalling codes that can have 16 different values. Out of these various values, let us reserve part (for example 8 different values) for a usage other than the recovery by the mobile terminals of the synchronization at multiframe level. These values, designated collectively by the letter S in what follows, are apportioned in a static manner to each multiframe of the traffic down path set up on the frequency $f_{TD}$.

The technique according to the invention consists in allowing the mobile terminals to use the other values of the signalling codes, that is to say the other eight values, or synchronization values respectively denoted a1 to a8 in what follows, for the search for synchronization at multiframe level.

In this example, eight distinct synchronization values, in fact nine if account is taken of the set collectively formed of the other eight values S, are therefore available for identifying in a unitary manner the 72 frames of the multiframe.

It is noted that a combination of two successive values drawn from an alphabet of nine letters allows 9×9=81 distinct words, which is already sufficient to identify the 72 frames of the multiframe unequivocally. Moreover, a combination of three letters drawn from the same alphabet allows 729 distinct words, which is yet more comfortable.

Figure 2:
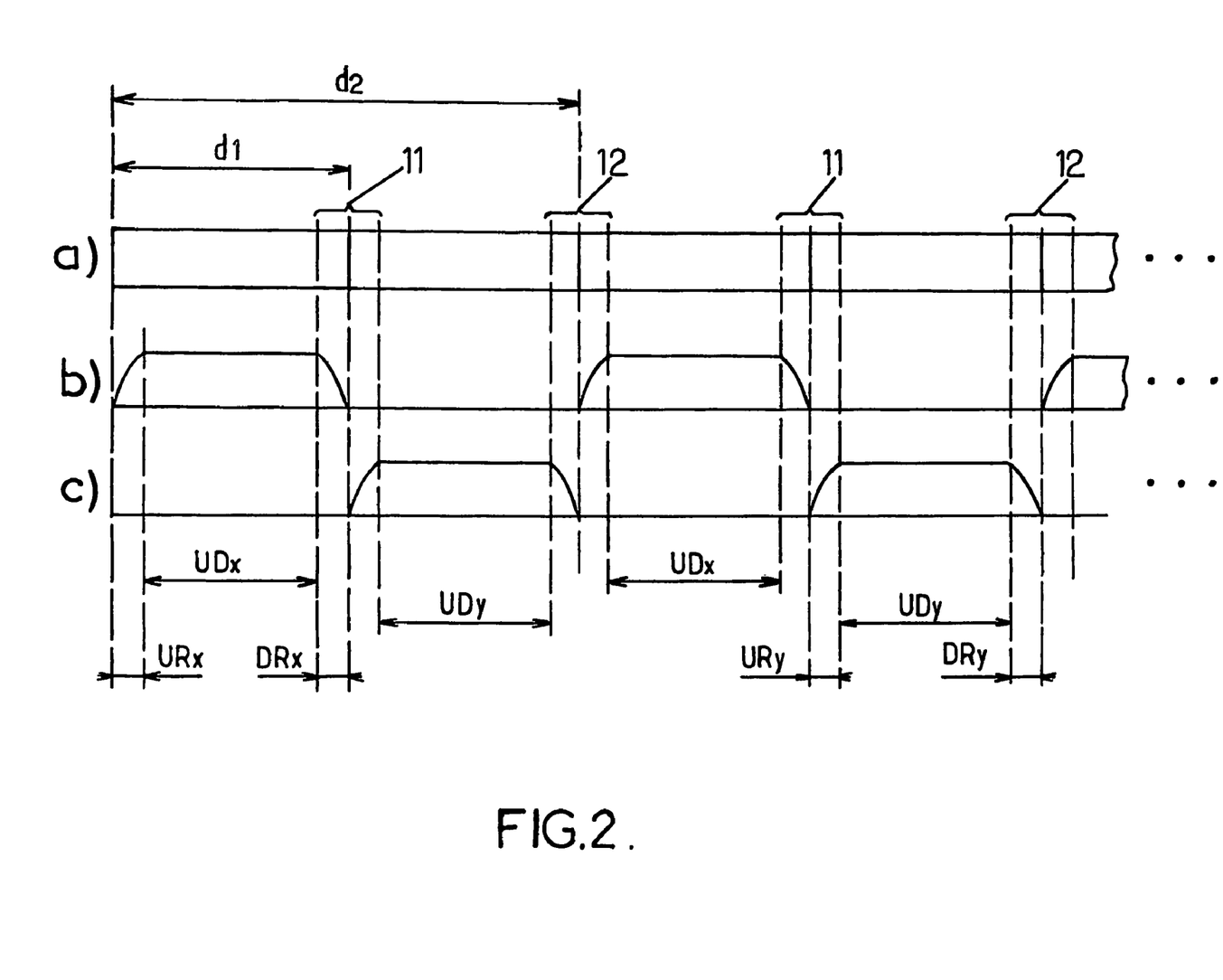
FIGS. 2a to 2c are graphs illustrating the exemplary temporal relation between the transmission of useful data frames (TCH or SACCH frames) on the one hand, and associated signalling frames (ASCH frames, see later) on the other hand, on the carrier frequency of a traffic down path in a TDMA-2 system.

Represented in FIG. 2a is the radio power emitted by the base station at the frequency $f_{TD}$ of the traffic down path. FIG. 2b shows the radio power emitted by a first mobile terminal at the frequency $f_{TU}$ of the traffic uplink (FIG. 3), and the radio power emitted by a second mobile terminal at the frequency $f_{TU}$ of the same traffic uplink, within TCH frames or SACCH frames.

On the traffic down path, the base station sends continuously. On the other hand, on the traffic uplink, each mobile terminal sends only half the time. In fact, each mobile terminal complies with a power ramp-up before sending each burst and a power ramp-down after this send, to limit the spectral occupancy. In practice, useful information sent by the first mobile terminal within frames of duration d1 is included within a time slot UDx between a power ramp-up URx and a power ramp-down DRx (FIG. 2b). Likewise, the useful information sent by the second mobile terminal within frames of duration d1 alternating with the previous frames, is included within a time slot UDx between a power ramp-up URy and a power ramp-down DRy (FIG. 2c).

For reasons of symmetry with the uplink, neither does the base station send traffic information during the time slots corresponding to the ramps URx, DRx, URy and DRy, which are called "ramp equivalents" in the jargon of the person skilled in the art.

This is why the AACH frames can be sent, for each TCH or SACCH frame of the down path, preferably in the ramp equivalent 11 corresponding to the ramps DRx and URy and in the ramp equivalent 12 corresponding to the ramps DRy and URx.

Other ramp equivalents, corresponding to other combinations of the time slots corresponding to the ramps URx, DRx, URy and DRy can be used but are less advantageous.

It can be shown that, in the exemplary TDMA-2 system considered here, the monitoring windows such as the windows W have a width of 60 ms in "half-duplex" mode and a width of 40 ms in "full-duplex" mode.

Depending on the time offset between the multiframes in the current cell and the multiframes in the destination cell, the mobile terminal can thus, for each monitoring window, receive and decode two or three consecutive synchronization values in "half-duplex" mode and only one or two consecutive synchronization values in "full-duplex" mode. Generalizing, it is assumed that in each monitoring window it can decode a sequence of Q successive synchronization values of the multiframe in the neighbouring cell, where Q is a nonzero integer. The term "successive" refers here to the order, in the multiframe, of the useful data frames (TCH or SACCH) with which are associated the AACH frames in which the signalling codes having the synchronization values are transmitted.

It is recalled that, in the exemplary system described here, the mobile terminal has at its disposal, per multiframe in the current cell, at most 4 monitoring windows, sacrificing all or part of the SACCH channels. The multiframe structures being identical in the current cell and in the destination cell, it can obtain as many sequences of 1, 2 or 3 successive synchronization values (as the case may be). Again generalizing, it is assumed that it has the ability to recover a number P of sequences each of Q successive synchronization values of the multiframe in the neighbouring cell.

Let us note that a traffic down path can support several different communications (within the context of TDMA structures of order 2 or higher), but that the terminals use all the AACH frames to synchronize themselves, namely those which are associated with the useful data frames of its own communication, and those which are associated with the useful data frames of the other communications.

Figure 3:
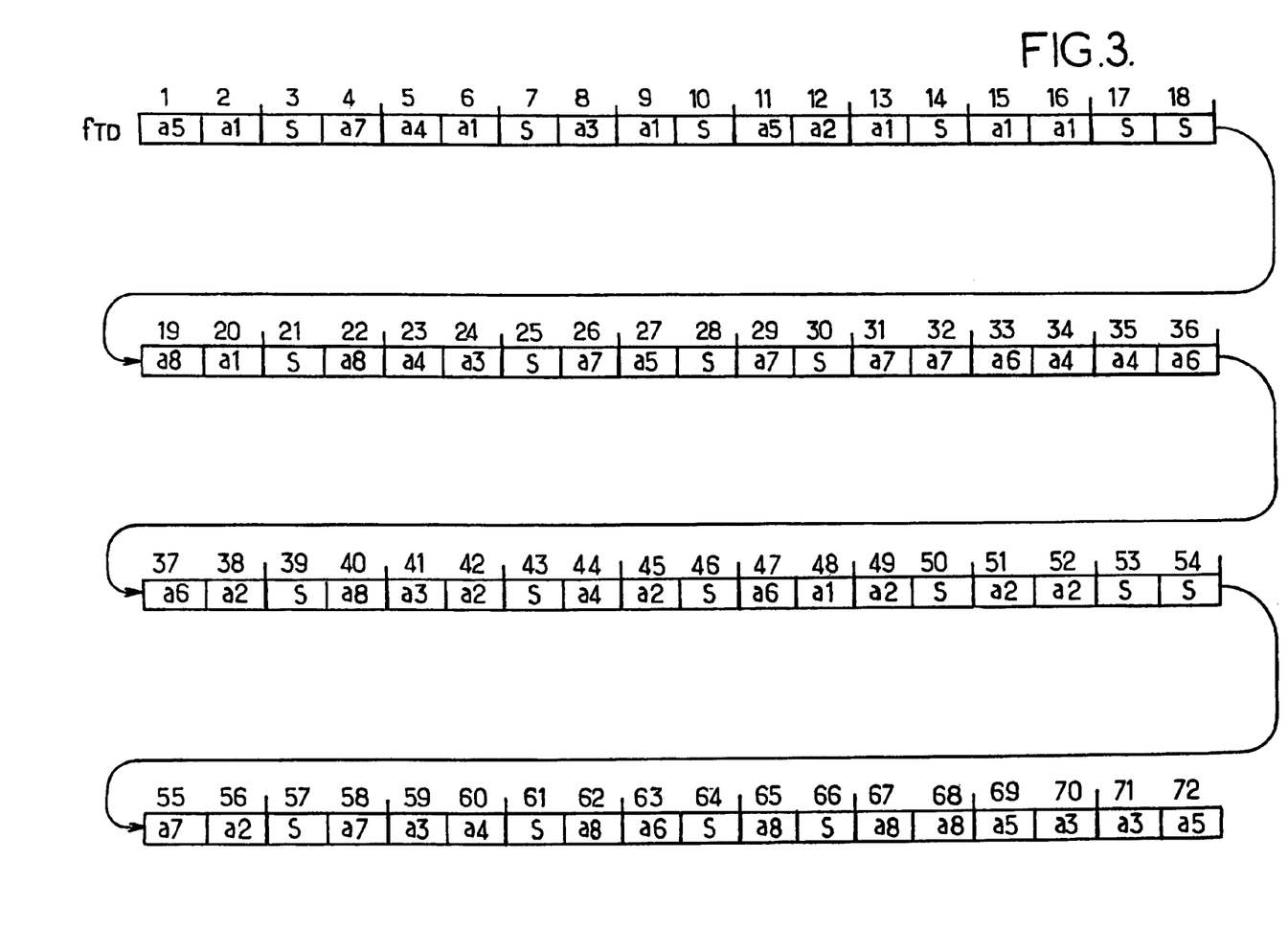
FIG. 3 is a diagram illustrating an exemplary apportioning of the various synchronization values within the multiframe structure of FIG. 1; and, FIG. 4 is a diagram illustrating a duplex communication between a mobile terminal and a base station of a radiocommunication system.

FIG. 3 gives an exemplary apportioning to the 72 AACH frames of the AACH channel multiplexed on the traffic down path, of the codes each having 8 synchronization values respectively denoted a1 to a8, as well as of the other signalling codes having a value collectively denoted S.

It is recalled that the codes of value S correspond to the signalling codes reserved for a usage other than the search for synchronization at multiframe level (for example for transferring signalling). The apportioning of the various specific values of the codes of value S depends on their respective function. In this example, constraints on the location of the codes of value S are as follows:

a code of value S is associated with the frames having index numbers 17, 18, 53 and 54;

two codes of value S are associated in 2 even AACH frames apportioned between the frames having index numbers 1 and 16, between the frames having index numbers 19 and 34, between the frames having index numbers 37 and 52, and between the frames having index numbers 55 and 70; and two codes of value S are associated in 2 odd AACH frames apportioned between the frames having index numbers 1 and 16, between the frames having index numbers 19 and 34, between the frames having index numbers 37 and 52, and between the frames having index numbers 55 and 70.

In the example represented, the codes of value S are transmitted in the AACH frames having index numbers 3, 7, 10, 14, 17 and 18, in the frames having index numbers 21, 25, 28 and 30, in the frames having index numbers 39, 43, 46, 50, 53 and 54, and finally in the frames having index numbers 57, 61, 64 and 66.

The apportioning of the synchronization values of value a1 to a8 must allow the mobile terminals to recover the multiframe synchronization, that is to say to identify each AACH frame unequivocally as a function of the synchronization value that it contains, but also of the synchronization values contained in other AACH frames (in particular the previous frame or frames and/or the subsequent frame or frames).

No unique a priori solution exists for this apportioning. Each solution depends on the various constraints taken into account, out of the group comprising: the aggregate duration of monitoring in each multiframe of the traffic down path in the destination cell (this duration itself being determined by the length and the number of the monitoring windows available for the mobile terminal, having regard to the multiframe structure); the apportioning of the monitoring windows (in particular the minimum duration between two monitorings) and finally the number of distinct synchronization values (in the example there are 9, corresponding to the values a1 to a8, and to the value S).

In the example illustrated in FIG. 3:

signalling codes having the synchronization value a1 are transmitted in the AACH frames numbered 2, 6, 9, 13, 15, 16, 20, and 48;

signalling codes having the synchronization value a2 are transmitted for example in the AACH frames numbered 12, 38, 42, 45, 49, 51, 52 and 56;

signalling codes having the synchronization value a3 are transmitted in the AACH frames numbered 8, 24, 41, 59, 70 and 71;

signalling codes having the synchronization value a4 are transmitted in the AACH frames numbered 5, 23, 34, 35, 44 and 60;

signalling codes having the synchronization value a5 are transmitted in the AACH frames numbered 1, 11, 27, 69 and 72;

signalling codes having the synchronization value a6 are transmitted in the AACH frames numbered 33, 36, 37, 47 and 63;

signalling codes having the synchronization value a7 are transmitted in the AACH frames numbered 4, 26, 29, 31, 32, 55 and 58;

signalling codes having the synchronization value a8 are transmitted in the AACH frames numbered 19, 22, 40, 62, 65, 67 and 68.

Of course, the exemplary apportionment given above is not limiting. This example is dictated by the aforesaid constraints as to the location of the codes of value S, which correspond to an envisaged application of the invention. Even taking these constraints into account, it is possible that other apportionments of the synchronization values a1 to a8 exist which are suitable or which are even better. To date, no mathematical procedure making it possible to define apportioning rules automatically is known. The choice of the apportioning of the synchronization values therefore remains empirical.

When a terminal is in the phase of monitoring the traffic down path in the destination cell (typically, when preparing a handover), it may receive and decode more or fewer consecutive AACH frames as a function of the size of the monitoring window and of the time offset between the current cell and the destination cell.

Let us consider that a synchronization value forms a letter. During one (or more) monitoring(s), a mobile terminal receives and decodes several consecutive AACH frames. The sequence obtained forms a word of several letters. If the word obtained is unique (i.e. the sequence of synchronization codes is unique), the multiframe synchronization is found. In the same way, if the sequences of synchronization values obtained during two (or more) successive monitorings form a unique word, the multiframe synchronization is found.

The above apportioning of the synchronization values to the AACH frames of the multiframes of the traffic down paths guarantees that:

every sequence of 3 consecutive synchronization values (P=1, Q=3) defines a unique word;

a sequence of two consecutive synchronization values (P=1, Q=2) defines a unique word in 46 cases out of 72 (corresponding to 63.88% of cases);

two consecutive monitorings 360 ms apart in which the mobile terminal decodes two consecutive AACH frames gives two sequences each of two consecutive synchronization values (P=2, Q=2), which define a unique word;

two consecutive monitorings 360 ms apart in which the terminal decodes a single AACH frames gives two sequences of one synchronization value each (P=2, Q=1), which define a unique word in 60 cases out of 72 (corresponding to 83.33% of cases).

Let us note that in the case where a mobile terminal that is monitoring cannot recover the synchronization at multiframe level, it has to widen its monitoring window. In the example, this occurs in particular in 12 cases out of 72, when two synchronization codes obtained in two successive monitorings 360 ms apart (case P=2, Q=1) do not define a unique word.

In this case, the widening of the monitoring window is done to the detriment of the traffic in the current cell of the terminal. This widening must be at least equal to 20 ms, in the example, to make it possible to receive and decode an extra AACH frame.

The invention has been described above in a preferred but nonlimiting mode of implementation. In particular, the fact that the AACH frames are multiplexed with the useful data frames (TCH frames or SACCH frames) on the carrier frequency on which the traffic down path is set up is advantageous since it requires no extra spectral resources, but is in no way necessary. It is in fact also possible to provide for the AACH frames to be sent on a dedicated signalling path, in synchronism with the destination traffic down path.

In the example described, the AACH channel may be used for other signalling transfers since, letting M denote the number of distinct values of the signalling codes (M is equal to 16 in the example described):
a) N is strictly less than M;
b) N−1 distinct determined values of the signalling codes, namely the values a1 to a8, form respectively N−1 first values out of the N distinct synchronization values; and
c) the M−N+1 other values of the signalling codes collectively form the N-th of the N distinct synchronization values, namely the value S. Nevertheless, these M−N+1 other values can serve to transmit any down signalling information.

The invention claim is:

1. Method for allowing the synchronization at a multiframe level of a mobile terminal of a radiocommunications system on a traffic downlink having a multiframe structure with a given number L of useful data frames, comprising:
   sending signalling frames by a base station of the system, which signalling frames are respectively associated with each useful data frame of the traffic downlink and which each contain a signalling code, wherein:
   a number N of distinct synchronization values of the signalling codes, which are usable by the mobile terminal to recover the synchronization at the multiframe level, that is less than L; and
   apportioning said N synchronization values over the associated signalling frames in such a way that there exist integers P and Q, which are not both equal to unity, such that the P×Q synchronization values respectively contained in P sequences of associated signalling frames each comprising Q signalling frames respectively associated with any Q consecutive useful data frames of a multiframe, form a unique word.

2. Method according to claim 1, wherein the associated signalling frames are multiplexed with the useful data frames on a carrier frequency allocated to the traffic downlink.

3. Method according to claim 2, wherein the radiocommunications system is a TDMA system of order 2 or higher, and the associated signalling frames are sent during time slots that correspond to the rise time and/or to the fall time of radio bursts corresponding to useful data frames sent on a traffic uplink associated with the traffic downlink.

4. Method according to claim 1, wherein, denotes a number of distinct values of the signalling codes:
   a) N is strictly less than M;
   b) N−1 distinct determined values of the signalling codes form respectively N−1 first values out of the N distinct synchronization values; and
   c) M−N+1 other values of the signalling codes collectively form the N-th of the N distinct synchronization values.

5. Method according to claim 1, wherein L is equal to 72 and N is equal to 9, and wherein:
   signalling codes having a first synchronization value are transmitted in the frames numbered 2, 6, 9, 13, 15, 16, 20, and 48;
   signalling codes having a second synchronization value are transmitted in the frames numbered 12, 38, 42, 45, 49, 51, 52 and 56;
   signalling codes having a third synchronization value are transmitted in the frames numbered 8, 24, 41, 59, 70 and 71;
   signalling codes having a fourth synchronization value are transmitted in the frames numbered 5, 23, 34, 35, 44 and 60;
   signalling codes having a fifth synchronization value are transmitted in the frames numbered 1, 11, 27, 69 and 72;
   signalling codes having a sixth synchronization value are transmitted in the frames numbered 33, 36, 37, 47 and 63;
   signalling codes having a seventh synchronization value are transmitted in the frames numbered 4, 26, 29, 31, 32, 55 and 58;
   signalling codes having an eighth synchronization value are transmitted in the frames numbered 19, 22, 40, 62, 65, 67 and 68; and
   signalling codes having a ninth and last synchronization value are transmitted in the frames numbered 3, 7, 10, 14, 17, 18, 21, 25, 28, 30, 39, 43, 46, 50, 53, 54, 57, 61, 64 and 66.

6. Method according to claim 4, wherein M is equal to 16.

7. Method of synchronization at a multiframe level of a mobile terminal of a radiocommunications system on a traffic downlink having a multiframe structure with a given number L of useful data frames, comprising the steps of:
   a) the mobile terminal monitoring at least P determined monitoring windows so as to detect signalling frames received from a base station of the system while being respectively associated with each useful data frame of the traffic downlink, wherein:
   a number N of distinct synchronization values of the signalling codes that is less than L;
   said N synchronization values are apportioned over the associated signalling frames in such a way that there exist integers P and Q, which are not both equal to unity, such that the P×Q synchronization values respectively contained in P sequences of associated signalling frames each comprising Q signalling frames respectively associated with any Q consecutive useful data frames of a multiframe, form a unique word;
   b) the mobile terminal receiving, in each of the monitoring windows, at least Q signalling frames respectively associated with any Q consecutive useful data frames of the traffic downlink;
   c) the mobile terminal recovering the synchronization at the multiframe level on the basis of a word formed of the P×Q synchronization values respectively contained in the P×Q associated signalling frame received at step b).

8. Method according to claim 7, wherein, the associated signalling frames being multiplexed with the useful data frames on a carrier frequency allocated to the traffic downlink, the mobile terminal, in step a), monitors said carrier frequency.

9. Signal intended to be sent by a base station of a radiocommunications system, on a determined carrier frequency allocated to a traffic downlink having a multiframe structure with a determined number L of useful data frames, comprising:

signalling frames respectively associated with each useful data frame and each containing a signalling code, and wherein:
- a number N of distinct synchronization values of the signalling codes, which are usable by the mobile terminal to recover the synchronization at a multiframe level, that is less than L; and
- said N synchronization values are apportioned over the associated signalling frames in such a way that there exist integers P and Q, which are not both equal to unity, such that the P×Q synchronization values respectively contained in P sequences of associated signalling frames each comprising Q signalling frames respectively associated with any Q consecutive useful data frames of a multiframe, form a unique word.

10. Signal according to claim 9, wherein, the radiocommunications system is a TDMA system of order 2 or higher, the associated signalling frames are provided for so as to be sent during time slots that correspond to the rise time and/or to the fall time of radio bursts corresponding to useful data frames sent on a traffic uplink associated with the traffic downlink.

11. Signal according to claim 9, wherein M denotes a number of distinct values of the signalling codes;
a) N is strictly less than M;
b) N−1 distinct determined values of the signalling codes form respectively N−1 first values out of the N distinct synchronization values; and
c) M−N+1 other values of the signalling codes collectively form the N-th of the N distinct synchronization values.

12. Signal according to claim 9, wherein L is equal to 72 and N is equal to 9, and wherein:
- signalling codes having a first synchronization value are provided for in the frames numbered 2, 6, 9, 13, 15, 16, 20, and 48;
- signalling codes having a second synchronization value are provided for in the frames numbered 12, 38, 42, 45, 49, 51, 52 and 56;
- signalling codes having a third synchronization value are provided for in the frames numbered 8,24,41,59,70 and 71;
- signalling codes having a fourth synchronization value are provided for in the frames numbered 5, 23, 34, 35, 44 and 60;
- signalling codes having a fifth synchronization value are provided for in the frames numbered 1, 11, 27, 69 and 72;
- signalling codes having a sixth synchronization value are provided for in the frames numbered 33, 36, 37, 47 and 63;
- signalling codes having a seventh synchronization value are provided for in the frames numbered 4, 26, 29, 31, 32, 55 and 58;
- signalling codes having an eighth synchronization value are provided for in the frames numbered 19, 22, 40, 62, 65, 67 and 68; and
- signalling codes having a ninth and last synchronization value are provided for in the frames numbered 3, 7, 10, 14, 17, 18, 21, 25, 28, 30, 39, 43, 46, 50, 53, 54, 57, 61, 64 and 66.

13. Signal according to claim 11, wherein M is equal to 16.

* * * * *